(12) United States Patent
Fino et al.

(10) Patent No.: US 11,667,065 B2
(45) Date of Patent: Jun. 6, 2023

(54) FORMING PROCESS TO MANUFACTURE A FINISHING/COVERING ELEMENT FOR A COMPONENT IN A VEHICLE PASSENGER COMPARTMENT, AND FINISHING/COVERING ELEMENT MANUFACTURED BY MEANS OF SAID PROCESS

(71) Applicant: FCA ITALY S.p.A., Turin (IT)

(72) Inventors: Federica Fino, Turin (IT); Martino L'Altrella, Turin (IT); Matteo Strumia, Orbassano (IT); Elena Bergadano, Turin (IT); Maurizio Servetti, Orbassano (IT); Fabio Massolo, Turin (IT)

(73) Assignee: FCA ITALY S.p.A., Turin (IT)

(*) Notice: Subject to any disclaimer, the term of this patent is extended or adjusted under 35 U.S.C. 154(b) by 357 days.

(21) Appl. No.: 16/600,998

(22) Filed: Oct. 14, 2019

(65) Prior Publication Data

US 2020/0114554 A1    Apr. 16, 2020

(30) Foreign Application Priority Data

Oct. 15, 2018  (EP) .................................. 182004481

(51) Int. Cl.
*B29C 45/26* (2006.01)
*B29C 45/00* (2006.01)
(Continued)

(52) U.S. Cl.
CPC ...... *B29C 45/2602* (2013.01); *B29C 45/0005* (2013.01); *B29K 2075/00* (2013.01); *B29K 2309/08* (2013.01); *B29L 2031/3005* (2013.01)

(58) Field of Classification Search
CPC . B29C 45/372; B29C 33/424; B29C 45/0005; B29C 45/2602; B29C 33/3842;
(Continued)

(56) References Cited

U.S. PATENT DOCUMENTS

| 6,890,586 | B2* | 5/2005 | Beck | ................ B29C 37/0032 427/372.2 |
|---|---|---|---|---|
| 9,803,080 | B2* | 10/2017 | Parssinen | .............. A61L 15/125 |
| 2003/0108704 | A1* | 6/2003 | Yano | ...................... B32B 27/08 428/35.7 |

FOREIGN PATENT DOCUMENTS

| CN | 106232316 A | 12/2016 |
|---|---|---|
| CN | 106541660 A | 3/2017 |

(Continued)

OTHER PUBLICATIONS

"Dictionary of Chinese Industrial Products" by Yibo Bo, p. 317, published May 31, 1988 (3 pages).
Chinese Office Action issued in corresponding Chinese patent application No. 2019109742673 dated Sep. 29, 2021 (10 pages).
(Continued)

*Primary Examiner* — Monica A Huson
*Assistant Examiner* — Kelsey C Grace
(74) *Attorney, Agent, or Firm* — Harness, Dickey & Pierce, P.L.C.

(57) ABSTRACT

A finishing/covering element for a component in a vehicle passenger compartment has a front surface facing, in use, the inside of the passenger compartment and a rear surface facing, in use, the component on which the finishing/covering element is fitted; the finishing/covering element is manufactured by moulding a thermoplastic material in a mould, which has a first and a second forming surface facing one another; the first forming surface forms the outline of the front surface and is embossed so as to form a corresponding embossing on the front surface, without further treatments (Continued)

and/or coating operations and/or processing on the front surface after the moulding; at the same time, the moulded thermoplastic material comprises a thermoplastic polyurethane reinforced by reinforcement fibres.

7 Claims, 2 Drawing Sheets

(51) Int. Cl.
*B29K 75/00* (2006.01)
*B29K 309/08* (2006.01)
*B29L 31/30* (2006.01)

(58) Field of Classification Search
CPC ............ B60R 13/02; B29L 2031/3005; B29L 2031/3041; B29K 2075/00; B29K 2309/08
See application file for complete search history.

(56) References Cited

FOREIGN PATENT DOCUMENTS

| | | |
|---|---|---|
| CN | 107554612 A | 1/2018 |
| CN | 108015962 A | 5/2018 |
| DE | 102005045047 A1 | 3/2007 |
| JP | 2003071868 A | 3/2003 |
| WO | 2008039062 A2 | 4/2008 |

OTHER PUBLICATIONS

European Search Report dated Mar. 14, 2019 in corresponding European patent application 182004481 (7 pages).
Office Action issued in corresponding Chinese Patent Application No. 201910974267.3 dated Dec. 27, 2021.
"Principles of Injection Molding of Thermoplastics" (USSR), p. 251, Light Industry Press, 19830731.

* cited by examiner

FORMING PROCESS TO MANUFACTURE A FINISHING/COVERING ELEMENT FOR A COMPONENT IN A VEHICLE PASSENGER COMPARTMENT, AND FINISHING/COVERING ELEMENT MANUFACTURED BY MEANS OF SAID PROCESS

CROSS-REFERENCE TO RELATED APPLICATION

This patent application claims the benefit and priority of European Patent Application No. 18200448.1 filed on Oct. 15, 2018, the entire disclosure of which is incorporated herein by reference.

TECHNICAL FIELD

The invention relates to a forming process to manufacture a finishing/covering element, suitable to be coupled to a corresponding component in a vehicle passenger compartment, so as to cover and/or make aesthetically appealing an outer portion of said component.

BACKGROUND ART

When dealing with finishing elements to be used inside the passenger compartment, these elements must meet different requirements, not only in term of structural features (concerning, for example, elasticity/flexibility, resistance, thermal expansion, etc.), but also in terms of properties of the outer surface that remains exposed in the passenger compartment after the installation. In particular, the outer surface must have a predetermined degree of gloss and must meet predetermined requirements in terms of superficial resistance to damages (scratches, hits, etc.). For this latter requirement, specific tests, also known as "scratch & mar" tests, must usually be passed. On the other hand, for the aforesaid gloss requirements, inside the passenger compartment components usually need to reach a gloss value established in the designing phase, so as to ensure the aesthetic appeal and the harmony of the passenger compartment. In some solutions, for example, components are required to have a gloss smaller than or equal to 2 GU ("gloss unit"), with a 10% margin of error.

In known solutions, passenger compartment finishing elements are generally made of polycarbonate (PC), acrylonitrile butadiene styrene (ABS), polypropylene or mixtures of these plastic materials, for example mixtures of PC/ABS. At the end of the moulding process, the products obtain a relatively high superficial gloss value, i.e. greater than or equal to 3 GU, and are therefore painted on the surface, on the side that will be exposed in the passenger compartment, in order to reduce the gloss value until it reaches the requested values. The paint also fulfills the aim of granting a greater resistance to damages, improving the aesthetic appeal of the passenger compartment or creating particular and new aesthetic effects.

The solutions described above are scarcely satisfying because the painting process needs relatively long times and relatively expensive dedicated apparatuses, not only for the painting itself, but also for the cleaning, for the protection and the safety of the painting rooms.

Furthermore, for the moulding of the known plastic materials mentioned above, the mould has a relatively high temperature, approximately 90° C., which usually requires proper measures to avoid jamming of the movable parts of the mould.

DISCLOSURE OF INVENTION

The object of the invention is to provide a forming process to manufacture a fishing/covering element for a component of a vehicle passenger compartment, which can solve the drawbacks discussed above in a simple and low-cost fashion, meet the superficial gloss requirements as well as the anti-scratch resistance requirements, which are usually established for these types of elements, and obtain a superficial effect that is similar to the one that would be obtained with a traditional paint.

According to the invention, there is provided a forming process to manufacture a finishing/covering element for a component in a vehicle passenger compartment, as set forth in claim 1.

BRIEF DESCRIPTION OF THE DRAWINGS

The invention will be best understood upon perusal of the following detailed description of a preferred embodiment, which is provided by mere way of example and is not limiting, with reference to the accompanying drawings, wherein.

BEST MODE FOR CARRYING OUT THE INVENTION

Figure 1:
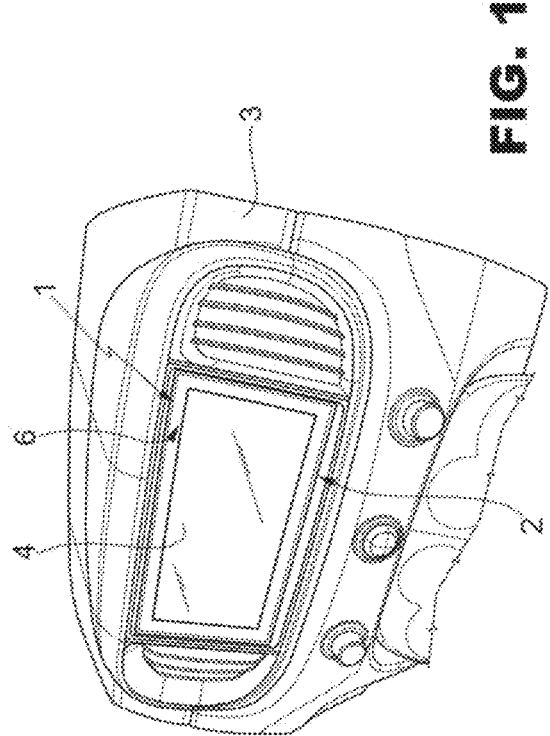
FIG. 1 is perspective front view of a possible embodiment of the finishing/covering element for a component in a vehicle passenger compartment, manufactured by means of the forming process according to the invention.

In FIG. 1, number 1 indicates a finishing/covering element coupled to a component 2, present in a vehicle passenger compartment. In particular, the component 2 is arranged in the area of a (partially shown) dashboard 3 in a front area of the passenger compartment. In the specific solution shown herein, the component 2 comprises a screen 4 and is defined by a automotive navigation system or by an automotive head unit. The element 1 is defined by a substantially rectangular frame with rounded corners, which is arranged along a perimeter of the component 2, in particular so as to surround the screen 4. According to other examples which are not shown herein, the component 2 is defined by an instrument cluster, by a vent or by a control panel, for example by a panel provided with buttons and/or knobs to control an air conditioning system of the vehicle.

Anyway, the invention is not limited to specific shapes and/or dimensions of the element 1, which, hence, could be different from the one discussed herein by mere way of example. In particular, it could have an annular shape different from the one indicated herein or it could be defined by a simple straight—and not curved—strip with no annular shape.

Also the coupling system applied between the element 1 and the component 2 is not relevant for the purposes of the invention: for instance, this system could be defined by a snapping or interlocking coupling or by gluing.

Figure 2:
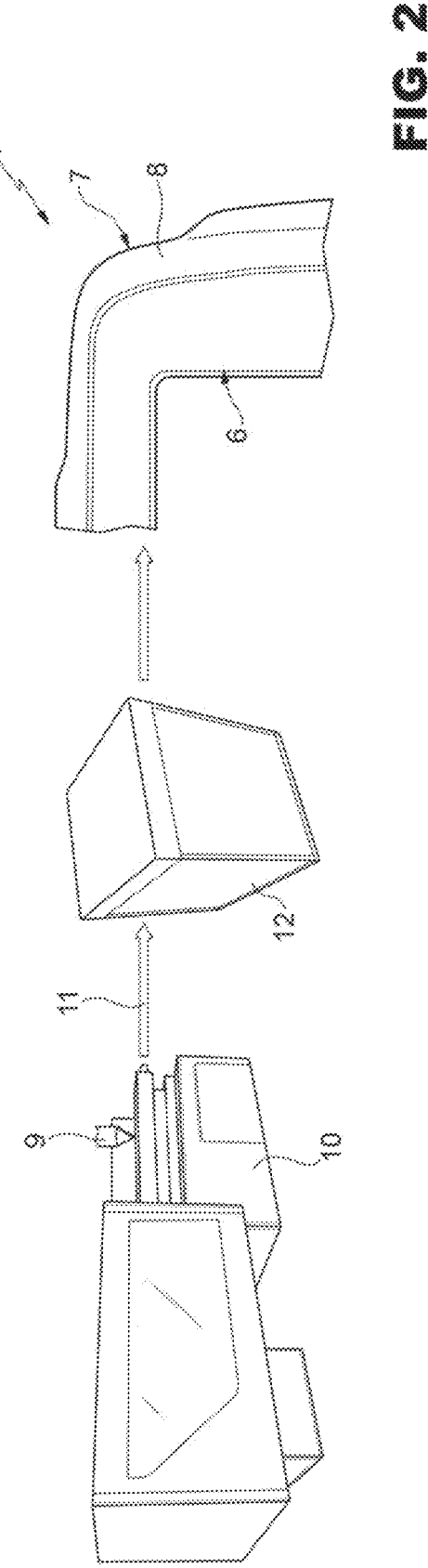
FIG. 2 schematically shows a preferred embodiment of the forming process according to the invention.
Figure 3:
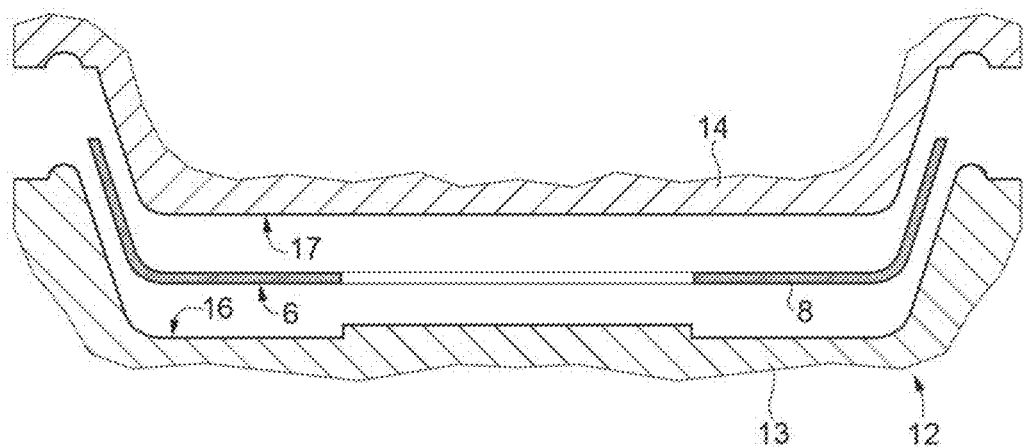
FIG. 3 shows, in an exploded cross section view and in a simplified manner, a mould used in the forming process of FIG. 2.
Figure 4:
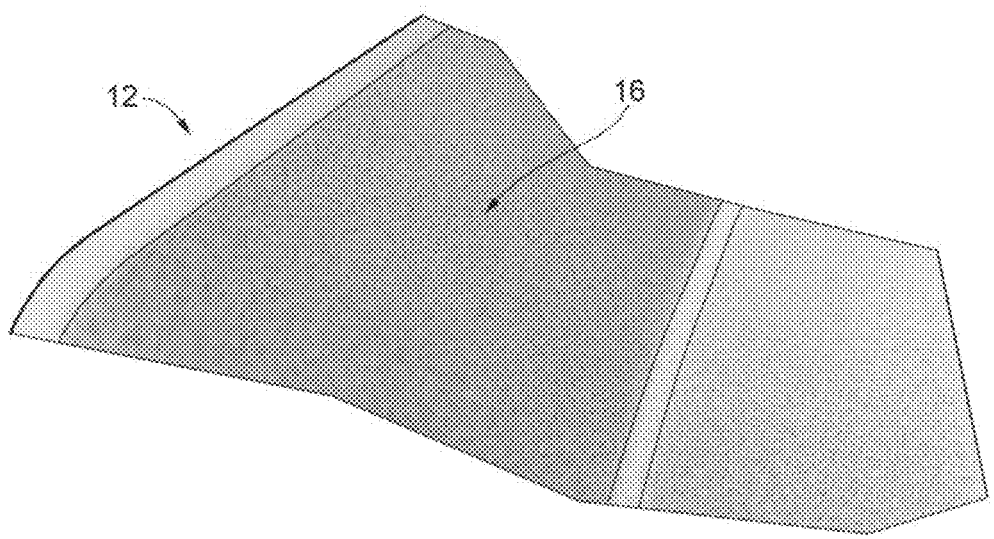
FIG. 4 is a perspective view of a detail of the mould of FIG. 3.

With reference to FIG. 2, the element 1 has an outer or front surface 6, which, in use faces the passenger compartment of the vehicle, and an inner or rear face 7, which is opposite the surface 6 and, in use, faces the component 2. According to an aspect of the invention, at least part of the surface 6 is embossed, namely granular, rough or uneven. In other words, it is not smooth so that that is has a relatively high aesthetic appeal, both visually and upon touching.

The preferred or desired roughness values (ISO 4287 standard) are the following (with a margin of difference/error of ±10%):
Pt: 17 μm (maximum height, from peak to through, of the primary profile)
Ra: 2 μm (mathematical mean height of the roughness profile)
Rz: 13 μm (mean height, from peak to through, of the roughness profile)
Rt: 15 μm (maximum height, from peak to through, of the roughness profile)

The material of the element 1 comprises a fibre-reinforced thermoplastic polyurethane (TPU). In particular, the material of the element 1 is defined by said reinforced TPU.

The TPU allows to obtain:
relatively low gloss values, namely values of 2 GU (with a 10% margin of error), for the surface 6, with no need to apply opaque paints or coatings;
a high scratch resistance to meet the requirements and pass the "scratch & mar" tests carried out on the surface 6.

At the same time, the fibres contained in the TPU allow to meet the requirements set forth in terms of rigidity/elasticity and break-resistance. The fibres contained in the TPU preferably are glass fibres, even if, as an alternative, fibres of a different material could be used, for example carbon fibres. The quantity of fibres contained in the TPU advantageously ranges from 10% to 30% (determined according to ISO 3451-1 standard).

In particular, the material of the element 1 includes a percentage of glass fibres amounting to approximately 20%.

FIG. 2 schematically shows that the element 1 is defined by one single piece 8 manufactured through moulding, in particular through injection moulding. The TPU is produced in a known manner (polyaddition reaction between an isocyanate and one or more polyols) and is available, for example, in the form of granules 9, which are introduced into a known injection press 10. The latter, through heating, melts the granules 9 and then feeds the molten material 11, containing the fibres, under pressure into a mould 12. Figure schematically shows that the mould 12 comprises a fixed part 13, called mouldmaker, and a movable part 14, called moulder. When the mould 12 is closed, the parts 13 and 14 define a cavity, into which the material 11 is injected. When the cavity is completely full, the mould 12 is cooled down in a known manner not shown herein, for example through forced circulation of cold water, so that the injected material reaches the solid state, thus consolidating the piece 8. The temperature of the mould preferably is below 70° C. In the example described herein, the mould 12 is cooled down to a temperature ranging from 40° C. to 50° C. During the cooling step, the temperature of the injected material decreases and its density increases: in order to make up for the volume decrease and, hence, the shrinking of the material (which would cause the formation of hollows in the piece 8), the press 10 keeps feeding the material 11 at a lower pressure (holding pressure). At the end of the cooling and after having obtained the consolidation of the piece 8, the mould is opened, moving the movable part 14, in order to the remove the piece 8, for example through an extractor.

According to a preferred embodiment of the invention, as already mentioned above, the piece 8, after the moulding, corresponds to the element 1, i.e. the piece 8 is not subjected to any further treatment and/or processing and/or coating operation and/or painting operation after the moulding and is just ready to be fitted in the vehicle.

More in detail, the mould 12 has two forming surfaces 16 and 17, whose shape reproduces in negative the surface 6 and the surface 7, respectively. More in detail, the surface 16 is carried by the fixed part 13 and is embossed so as to be complementary to the surface 6, in order to obtain the roughness of the surface 6.

The preferred roughness values (ISO 4287 standard), in order to obtain the roughness indicated above for the surface 6, are the following (with a margin of difference/error of ±10%):
Pt: 19 μm (maximum height, from peak to through, of the primary profile)
Ra: 2.015 μm (mathematical mean height of the roughness profile)
Rz: 15.287 μm (mean height, from peak to through, of the roughness profile)
Rt: 19.520 μm (maximum height, from peak to through, of the roughness profile)
TMR: 24 μm (Total material removal)

This roughness can be obtained, for example, by starting from a mould having smooth forming surfaces and by treating them, so as to remove material, by means of one of the following techniques (listed in order from the least precise to the most precise and "advanced"):
electrical discharge machining;
photo etching/chemical etching;
laser etching;
mixed system "chemical etching"+"laser etching" (for instance, with a main pattern obtained through chemical etching and some final laser etching operations to create greater details or to make the main patter more opaque).

According to a variant which is not shown herein, the surface 16 is carried by the movable part 14.

According to a different embodiment which is not shown herein, the surface 6 of the element 1 is still directly formed by the surface 16 of the mould 12, without any following treatment, processing, coating or painting, as explained above, but the surface 7 of the element 1 is defined by an element that is distinct from the reinforced-TPU piece 8: for example, the surface 7 of the element 1 can be defined by a rear coating/covering applied to the piece 8 or by an insert on which the TPU is overmoulded, for example in order to reinforce the element 1 at the back and/or to the facilitate the coupling to the component 2.

According to variants which are not shown herein, the piece 8 is obtained by means of type of moulding other than injection moulding, for example by means of thermoforming.

The advantages offered by the invention are evident from the description above. Indeed, as already mentioned above, the TPU allows manufacturers to obtain the desired gloss values and to pass the "scratch & mar" tests which are usually requested for the exposed surfaces of a passenger compartment. The embossing and, in particular, the roughness values indicated above allow the surface 6 to have a special aesthetic appeal and a touching sensation know as "soft-touch", similarly to the result that could be obtained with a painting of the surface. At the same time, the embossing is directly obtained in the mould 12, namely it does not require further dedicated and additional operations, treatments and processing after the moulding.

In particular, compared to known solutions, there is a complete elimination of the operations carried out to paint the outer surface exposed in the passenger compartment, though ensuring a high quality and an aesthetic appeal of the outer surface.

Generally speaking, the surface 7 does not need further treatments and/or additional elements after the moulding, as well, which means that it can be directly applied to the component 2.

Therefore, thanks to the process of the invention, manufacturers can now offer relatively high-quality finishing/covering elements for passenger compartments in a a simple manner, with relatively limited times/costs.

In addition, the consolidation temperatures of the thermoplastic polyurethane in the mould 12 are lower compared to other thermoplastic materials used in known processes, which means that the movable part 14 is subjected to a smaller thermal expansion: as a consequence, the movable part 14 does not experience jamming during the movements performed to open the mould 12, without having to adopt special measures, which, instead, are needed in known solutions to avoid said jamming.

Finally, owing to the above, the process and/or the element 1 described with reference to the accompanying drawings can be subjected to changes and variations, which do not go beyond the scope of protection of the invention, as set forth in the appended claims.

In particular, as already mentioned above, the element 1 could have a different shape and/or different dimensions compared to what disclosed herein by way of example.

The invention claimed is:

1. A forming process to manufacture a finishing/covering element for a component of a vehicle passenger compartment, the finishing/covering element including a front surface and a rear surface, which are opposite one another, the front surface configured to face, in use, said passenger compartment and the rear surface configured to face, in use, said component, the process comprising:
    a molding step by injection molding, during which a thermoplastic material is injected and molded in a mold, which has a first forming surface and a second forming surface facing one another, the first forming surface forming the outline of said front surface during the molding step;
wherein:
    said thermoplastic material is the only material injected and molded in said mold, so that the second forming surface forms the outline of said rear surface during the molding step, and so that said front surface and said rear surface are both defined by the same thermoplastic material;
    said thermoplastic material is defined by a thermoplastic polyurethane reinforced by reinforcement fibres; and
    said first forming surface is an embossed surface forming a corresponding embossing on the front surface.

2. The process according to claim 1, wherein, after having formed said embossing on the front surface during the molding step, no further treatments and/or coating operations and/or processing are provided on said front surface.

3. The process according to claim 1, wherein said fibres are glass fibres.

4. The process according to claim 1, wherein said fibres are present in a percentage ranging from 10% to 30%.

5. The process according to claim 1, wherein the injection molding comprises a cooling to a temperature ranging from 40 to 60° C. to consolidate the molding to thermoplastic material.

6. The process according to claim 1, wherein the second forming surface forms the outline of said rear surface during the molding step, without further treatments and/or coating operations and/or processing on said rear surface after the molding step.

7. The process according to claim 1, wherein said first forming surface is a laser-embossed surface.

\* \* \* \* \*